United States Patent [19]
Burgess

[11] Patent Number: 6,029,709
[45] Date of Patent: Feb. 29, 2000

[54] LOCKABLE ENCLOSURE WITH GRIPPING-TOGGLE DEVICE FOR SECURING ACCESS TO THE HOLLOW INTERIOR OF CYLINDRICAL PIPES

[76] Inventor: James Gordon Burgess, 4318 Benning, Houston, Tex. 77035

[21] Appl. No.: 08/895,404

[22] Filed: Jul. 16, 1997

Related U.S. Application Data

[60] Provisional application No. 60/021,978, Jul. 18, 1996.

[51] Int. Cl.[7] .................................................. F16L 55/11
[52] U.S. Cl. .................................................. 138/89; 138/90
[58] Field of Search ........................................ 138/89, 90

[56] References Cited

U.S. PATENT DOCUMENTS

| | | | |
|---|---|---|---|
| 854,986 | 5/1907 | De Weese | 138/89 |
| 1,193,769 | 8/1916 | Cushing | 166/13 |
| 1,835,377 | 12/1931 | Clark | 166/13 |
| 2,375,995 | 5/1945 | Kaeser | 138/90 |
| 2,512,169 | 6/1950 | Nachtigal | 138/89 |
| 2,810,401 | 10/1957 | Stansbury | 138/89 |
| 4,248,271 | 2/1981 | Burgess | 138/89 |
| 4,493,344 | 1/1985 | Mathison et al. | 138/89 |
| 4,817,671 | 4/1989 | Mathison et al. | 138/89 |
| 4,848,458 | 7/1989 | Holdsworth et al. | 166/92 |
| 5,184,608 | 2/1993 | Hale, III | 138/89 |
| 5,307,841 | 5/1994 | Condon | 138/90 |
| 5,437,309 | 8/1995 | Timmons | 138/89 |
| 5,439,130 | 8/1995 | Waugh | 220/210 |
| 5,531,250 | 7/1996 | Freeman et al. | 138/94 |

*Primary Examiner*—James F. Hook
*Attorney, Agent, or Firm*—Michael B. Jolly

[57] ABSTRACT

The present invention is an enclosure for securing selective access to the hollow interior of cylindrical pipes. The preferred embodiment comprises a selectively engagable toggling mechanism contained within a cylindrical body which transmits removal forces into increased frictional removal resistance forces. Toggling cross-arms provide the frictional resistance to removal by gripping the inner wall of the pipe. The device may also include a pipe interior seal and vent.

14 Claims, 4 Drawing Sheets

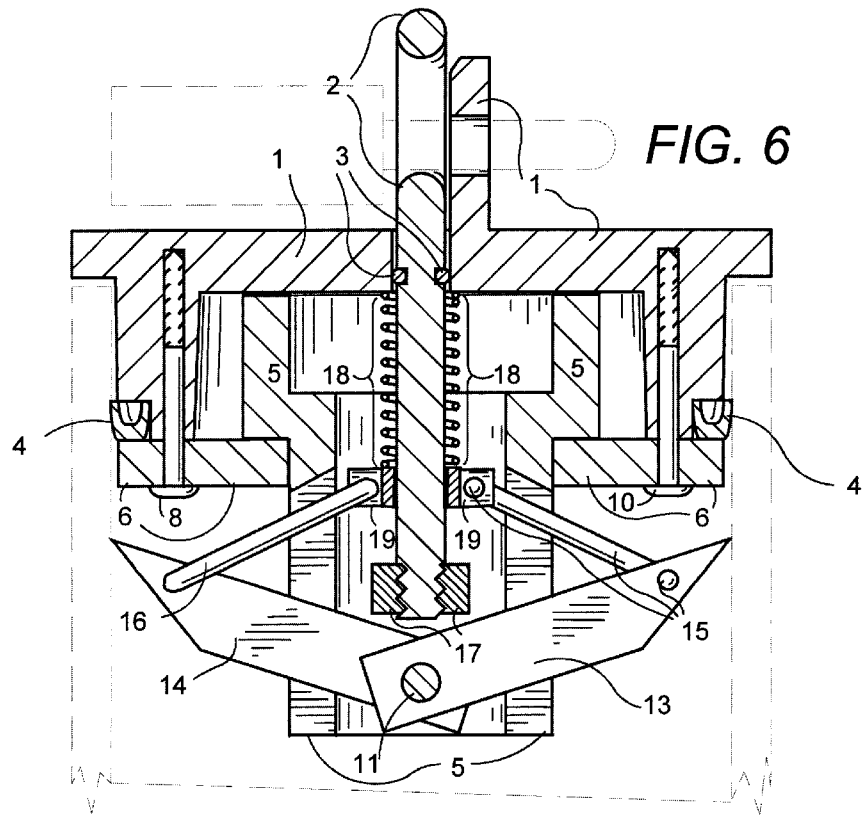
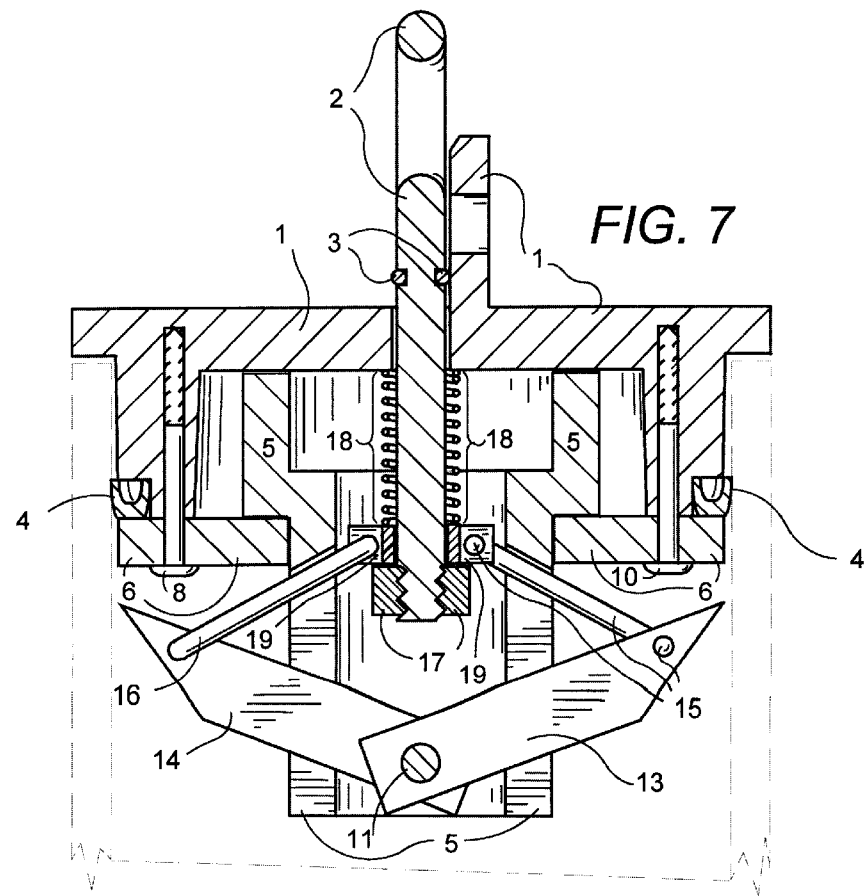

6,029,709

LOCKABLE ENCLOSURE WITH GRIPPING-TOGGLE DEVICE FOR SECURING ACCESS TO THE HOLLOW INTERIOR OF CYLINDRICAL PIPES

RELATED APPLICATION

This application relates to provisional application Ser. No. 60/021,978 filed on Jul. 18, 1996, and claims benefits to such application.

BACKGROUND

1. Field of the Invention

The invention relates to enclosures for the ends of cylindrical pipes, including access entrances for wells installed within the ground. The specific primary field that the present invention relates to is enclosures for the entrances into well casings of environmental monitoring wells which are installed in the ground, such as groundwater monitoring wells. Such wells require a locking mechanism for access security.

2. Prior Art

Numerous devices have been developed which provide an enclosing device for cylindrical pipe openings. None of these devices provide a pipe enclosure device which is selectively lockable in position within the pipe, a vent for venting the interior of the pipe prior to removing the enclosure, and a mechanism for quickly engaging and disengaging the dislodging force increasing mechanism, while also providing a seal for the interior of the pipe.

BRIEF DESCRIPTION OF THE DRAWINGS

FIG. 7 is presented in this view.

FIG. 6 is a cross-sectional right-side view of the preferred embodiment of the present invention in a locked position. In this view the present invention is fitted into the end of a pipe (shown in phantom lines) and has a padlock (shown on top, in phantom lines) attached in locked position.

FIG. 7 is a cross-sectional right-side view of the preferred embodiment the present invention in an unlocked position. In this view the present invention is fitted into the end of a pipe (shown in phantom lines).

DESCRIPTION OF THE PREFERRED EMBODIMENT

The preferred and main embodiment of the present invention (The Invention) is an enclosure for securing selective access to the hollow interior of cylindrical pipes. The invention provides security from unauthorized entries into hollow ends of pipes onto which The Invention is attached. The Invention provides this security by enclosing and resisting removal from hollow pipe ends. Toggling cross-arms which are built-in to The Invention provide this resistance to removal by gripping the inner wall of the pipe.

The cross-arms that grip the inner wall of the pipe initially toggle outward into the pipe wall because of the loaded force of a contracted spring. When The Invention is in the locked position and has a padlock appropriately attached to it, unauthorized attempts to remove The Invention cause an increase to the compression between the outer ends of the cross-arms and the inner pipe wall; the resulting resistance to removal increases in the direction of the attempted removal as the force attempting to remove The Invention increases. Removal of the attached padlock allows selective outward protraction of a pin through the enclosure body. The outward protraction of this pin through the enclosure body provides a force which is transmitted into contraction away from the inner pipe walls of the toggling cross-arms; thus allowing free removal of The Invention from the pipe.

The Invention includes an integral swivel that allows the exposed enclosure body to be rotated without affecting the contact location, or compression between the gripping-toggle cross-arms and the inner wall of the pipe end onto which The Invention is installed.

Two optional O-ring type seals isolate the interior of pipe onto which The Invention is installed. One of the optional O-ring type seals is provided around the enclosure body to contact the inner wall of the pipe to be secured. The other optional O-ring type seal is provided around the protractable pin so that the seal will contact the inner wall of the hole through the enclosure body which the same protractable pin travels through. The best mode for carrying out The Invention is presented, within this section.

DETAILED DESCRIPTION OF THE DRAWINGS

Figure 1:
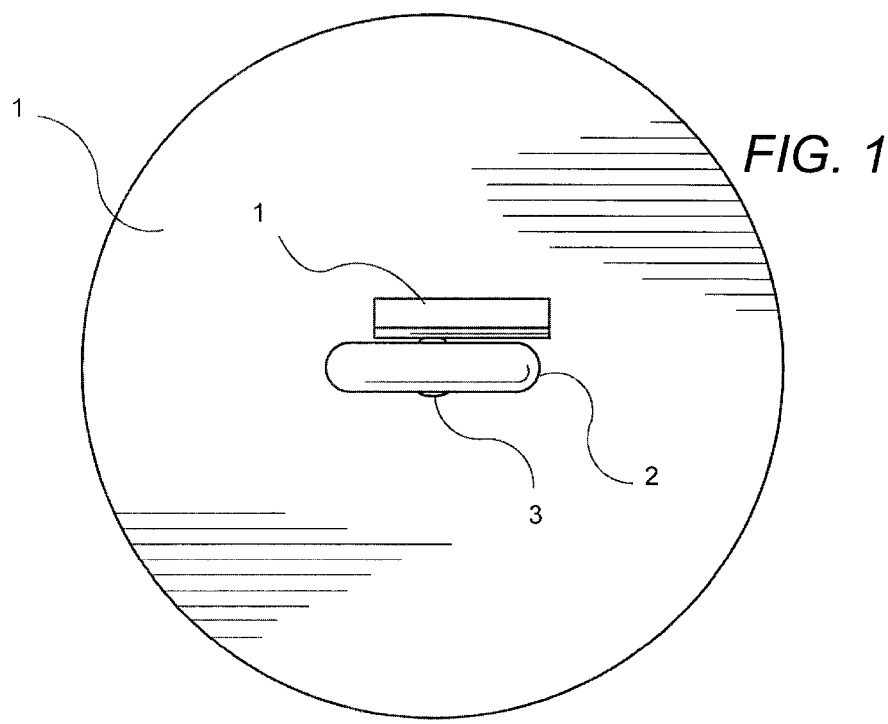
FIG. 1 is a view looking downward at the top of the preferred embodiment of the present invention.

Referring initially to FIG. 1 of the drawings, The Invention is shown in a view looking downward at the top of the assembly. The enclosure body (1) is constructed with a flattened to slightly domed round upper body surface, which has a similar outside diameter to the outside diameter of the pipe into which The Invention is installed; thus, when The Invention is installed onto a pipe, the entire periphery of the pipe end is covered by the enclosure body (1). Only two object forms extend above this rounded upper body surface into the view of FIG. 1; a tabular extension of the enclosure body (1), and the upper part of the eye pin (2). The top of the tabular extension of the enclosure body (1) appears generally as a horizontal rectangle in this view, with the lower edge of the rectangular top having an angular beveled surface. The rounded-eye end of the eye pin (2) appears below the tabular extension of the enclosure body (1) in this view, and is elongated in the same direction as the tabular extension. Two extreme ends of the eye-pin seal (3) may be seen looking into the eye pin hole within the enclosure body, where the eye-pin seal (3) seats between the tapered-cylindrical-hole-inner wall and the eye pin (2).

Figure 2:
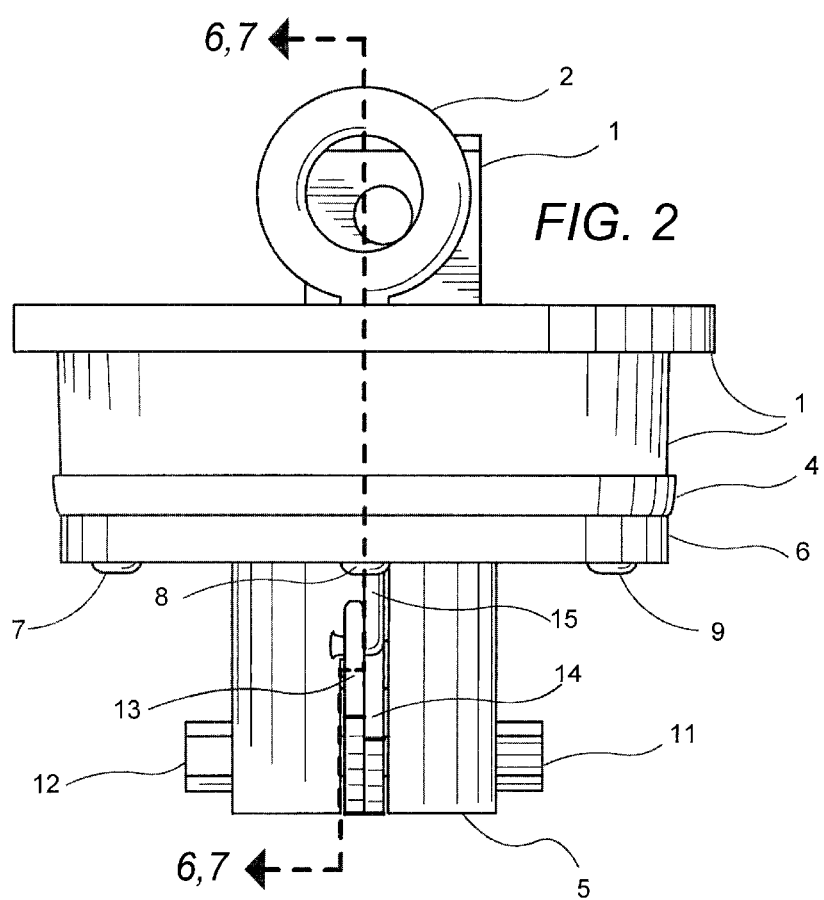
FIG. 2 is a view looking at the front of the preferred embodiment of the present invention. The section line for cross-sectional views FIG. 6

Refer to FIG. 2 to view the front of The Invention. The tabular extension of enclosure body (1) is located at the top of this view behind (to the right in this view) the upper part of the eye pin (2). This view reveals that the top portion of enclosure body (1) includes a cylindrical lip that extends outward from enclosure body (1) (seen to the left and right in this view). The lower-central-cylindrical portion of enclosure body (1) is slightly tapered downward for ease in manufacture, and for ease of insertion into pipes.

The primary seal (4) is an elastomer which extends to a larger diameter than that of the cylindrical portion of the enclosure body (1) that is inserted into a pipe. The swivel seat (6) is connected to the enclosure body (1) with swivel-seat fasteners #1 through #4, (7) through (10), three of which can be seen in FIG. 2. Swivel-seat fasteners #1 through #4, (7) through (10), are threaded into holes that extend upward into the enclosure body (1). The swivel (5) extends downward from an internal cavity within the enclosure body (1), and cannot be moved upward, or downward, but can be freely and continuously rotated to the left, or to the right. Within the swivel (5) is a slot in which cross-arm #1 (13) and cross-arm #2 (14) are positioned, The back end of cross-arm #2 (14) and the sharpened-pipe-wall-contacting end of cross-arm #1 (13) are, visible in this view. The lower portion of toggle bar #1 (15) which extends through a hole in cross-arm #1 (13) is also visible in its assembled position. The head of shear pin (11), and the shear-pin-lock nut (12) are seen to the right and left of the swivel (5), respectively. The body of shear pin (11) extends from the right, through a hole in the right side of the swivel (5), a hole in cross-arm #2 (14), a hole in cross-arm #1 (13), and a hole in the left side of swivel 5 where it then threads into a hole in shear-pin-lock nut (12). The section line for the cross-sectional views FIG. 6 and FIG. 7 is presented in this view.

Figure 3:
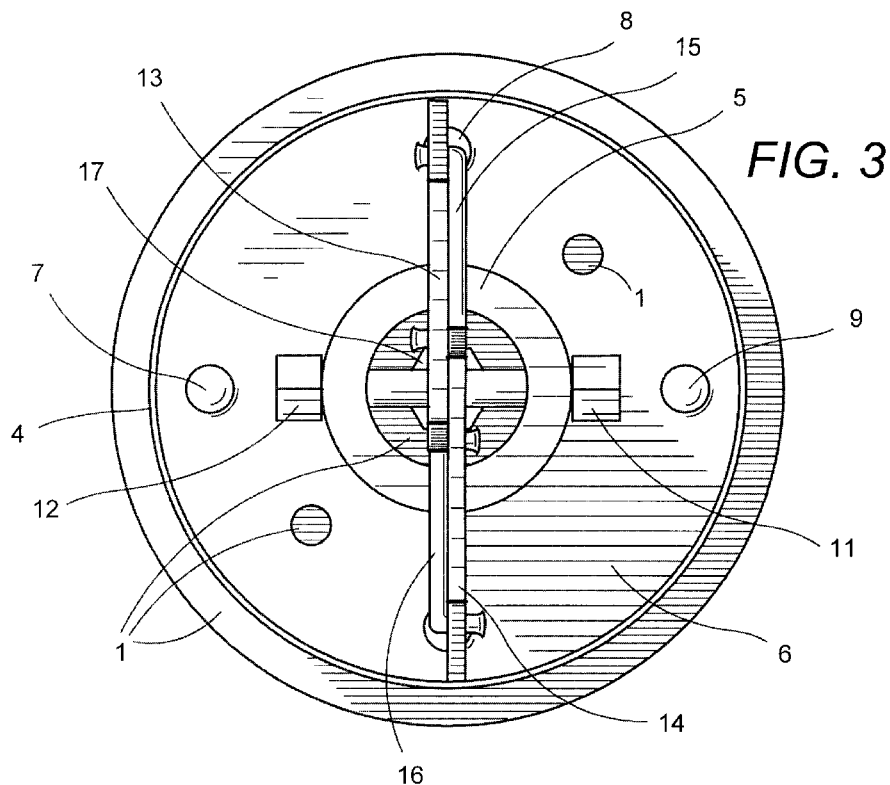
FIG. 3 is a view looking upward at the bottom of the preferred embodiment of the present invention.

FIG. 3 is a view looking upward at the bottom of The Invention. The bottom of the enclosure body's (1) cylindrical lip extends outward forming the outermost ring in this view. The portion of the primary seal (4) which extends outward to a larger diameter than that of the cylindrical portion of the lower enclosure body (1) can be seen, and appears as the next-smaller-concentric ring of this view. The flat bottom of swivel seat (6), which composes most of the field of view in FIG. 3, is seen with the mostly exposed heads of swivel-seat-fasteners #1 through #4, (7) through (10). Two drain holes, which penetrate through swivel seat (6), allow a view into the hollow cavity that exists between the bottom of enclosure body (1) and swivel seat (6). In this view swivel (5) extends outward from this cavity toward the viewer, and can be freely and continuously rotated clockwise or counter-clockwise. From this angle the full length of the bottom of the slot in swivel (5), in which cross-arm #1 (13) and cross-arm #2 (14) are positioned, is visible. The bottom of cross-arm #1 (13) and the bottom of cross-arm #2 (14) are visible. The bottom of both toggle bar #1 (15) and toggle bar #2 (16) are mostly visible. Toggle bar #2 (16) extends through a hole in cross-arm #2 (14), as toggle bar #1 (15) does with cross-arm #1 (13). The head of shear pin (11), and the shear-pin-lock nut (12) are seen to the right and left of swivel (5) respectively. The body of shear pin (11) extends from the right, through a hole in the right side of swivel (5), a hole in cross-arm #2 (14), a hole in cross-arm #1 (13), and a hole in the left side of swivel (5), where it then threads into a hole in shear-pin lock nut (12).

Figure 4:
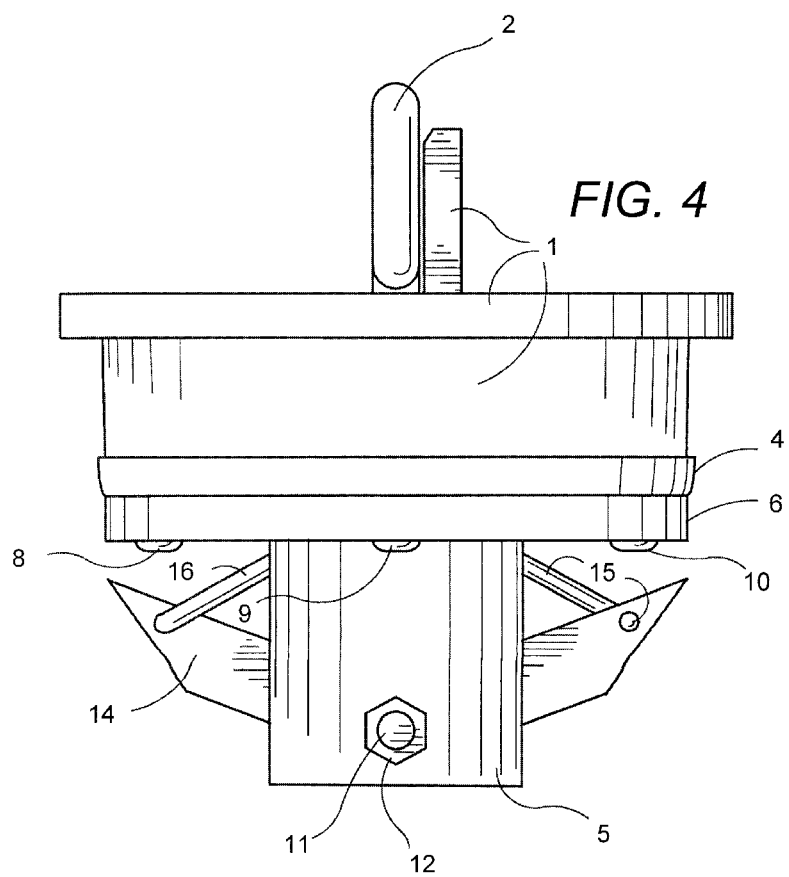
FIG. 4 is a view of the right side of the preferred embodiment of the present invention.

FIG. 4 is a view of the right side of The Invention. The tabular extension of enclosure body (1) is located at the top of this view behind (to the right in this view) the upper part of eye pin (2). The top portion of enclosure body (1) includes a cylindrical lip that extends outward from enclosure body (1) (seen to the left and right in this view). The lower-central-cylindrical portion of enclosure body (1) is slightly tapered downward for ease in manufacture, and for ease of insertion into pipes. Primary seal (4) extends to a larger diameter than that of the slightly tapered-lower cylindrical portion of the enclosure body (1). Swivel seat (6) is connected to the enclosure body (1) with swivel-seat fasteners #1 through #4, (7) through (10), three of which can be seen in FIG. 4. Swivel (5) extends downward from the internal cavity within the enclosure body (1). The sharpened-pipe-wall-contacting ends of cross-arm #1 (13) and cross-arm #2 (14) are positioned respectively to the right and left of swivel (5). The side of toggle bar #1 (15) which extends through a hole in cross-arm #1 (13) and the side of toggle bar #2 (16) which extends through a hole in cross-arm #2 (14) are also visible in their assembled positions. The threaded end of shear pin (11), and the end of shear-pin-lock nut (12) appear at the center near the bottom of the swivel (5).

Figure 5:
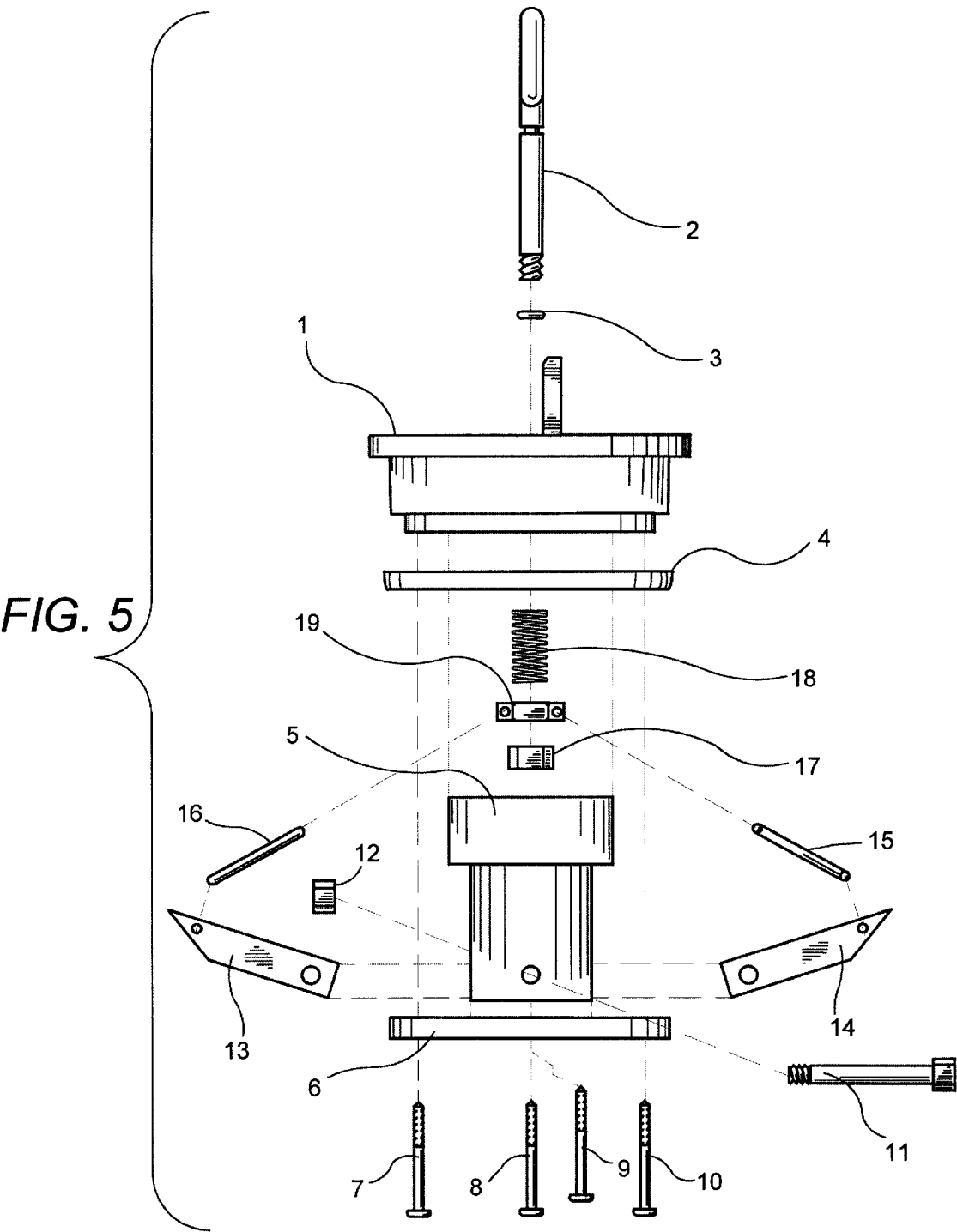
FIG. 5 is an exploded right-side view of the preferred embodiment of the present invention.

FIG. 5 is an exploded view of The Invention.

Operation of the Preferred Embodiment of the Present Invention: FIG. 6 and FIG. 7.

FIG. 6 is a cross-sectional-side view of The Invention in a locked position, In this view The Invention is fitted into the end of a pipe (shown in phantom lines) and has a padlock (shown at the top in phantom lines) attached in the locked position. Installation of The Invention is accomplished by simply pushing The Invention into the end of a pipe until the bottom of enclosure body (1) lid is near the top (end) of the pipe. Upon installation, the spring-loaded toggle-anchor system prevents removal of The Invention without prior removal of the padlock, and proper disengagement of the locking mechanism. In this view the tabular extension of enclosure body (1) is located at the top, and appears to the right of the upper part of the eye pin (2). A hole (21) extending through the tabular extension of enclosure body (1) is positioned so that a padlock can be secured through the hole, and simultaneously through the "eye" hole (22) of the eye pin (2). Eye pin (2) cannot be protracted through the enclosure body (1) in this arrangement as the padlock is in shear, and is preventing movement of eye pin (2).

FIG. 6 reveals the top portion of enclosure body's (1) cylindrical lip below the tabular extension. The lip extends outward from enclosure body (1) (seen to the left and right in this view). This lip causes The Invention to rest on the end of the pipe by preventing further movement into the pipe. When The Invention is in the locked position and has a padlock appropriately attached to it, unauthorized attempts to remove The Invention cause an increase to the compression between the outer ends of the cross-arms #1 (13) and #2 (14) and the inner pipe wall; the resulting resistance to removal increases in the direction of the attempted removal as the force attempting to remove The Invention increases. The sharpened-pipe-wall-contacting ends of cross-arm #1 (13) and cross-arm #2 (14) are positioned respectively to the right and left of swivel (5). Crossarms #1 (13) and #2 (14) grip the inner wall of the pipe initially by toggle outward into the pipe wall because of the loaded force of a contracted spring (18). The force of spring (18), which is assembled around the shaft of eye pin (2), is transferred to sliding-toggle knee (19), which otherwise would be free to slide up and down around the shaft of eye pin (2). Sliding-toggle knee (19) transmits force form contracted spring (18) to toggle bar #1 (15) toggle bar #2 (16), which in turn transmit the force to cross-arm #1 (13) and cross-arm #2 (14) respectively. The side of toggle bar #1 (15) which extends through a hole in cross-arm #1 (13) and the side of toggle bar #2 (16) which extends through a hole in cross-arm #2 (14) are visible in their assembled positions. The threaded end of shear pin (11) appears at the center near the bottom of the swivel (5).

The Invention includes an integral swivel mechanism that allows the portion of enclosure body (1), which is exposed to the exterior of the pipe, to be rotated without affecting the contact location, or compression between the cross-arms #1 (13) and #2 (14), and the inner wall of the pipe end onto which The Invention is installed. Swivel (5) extends downward from the internal cavity within the enclosure body (1), where it rests on and can rotate within a hole in swivel seat (6). Swivel seat (6) is connected to the enclosure body (1)

with swivel-seat fasteners #1 through #4, (7) through (10). When the portion of enclosure body (1) that is exposed to the exterior of the pipe is rotated, the cross-arms (13) and (14) remain in contact with the inner wall of the pipe, and swivel (5), shear pin (11), shear-pin-lock nut (12), toggle bar #1 (15), toggle bar #2 (16), and sliding-toggle knee (19) remain unturnable because of the integral swivel linkage with cross-arms #1 (13) and #2 (14). Enclosure body (1) rotates around swivel (5) while eye pin (2) rotates inside of the vertical hole in sliding-toggle knee (19).

Two optional O-ring type seals isolate the interior of the pipe onto which The Invention is installed. Eye-pin seal (3) is provided around the protractable eye pin (2) to contact the inner wall of the hole through the enclosure body (1) which eye pin (2) travels through, in order to make the hole fluid-fight. The primary seal (4) is an elastomer which extends to a larger diameter than that of the cylindrical portion of the enclosure body (1) which is inserted into a pipe. The primary seal (4) has an outer diameter that will contract under confining pressures to the same diameter as the inside diameter of the pipe into which it is installed; thus providing a fluid-fight seal between the enclosure body (1) and the inside wall of the pipe onto which The Invention is installed. A cross-sectional "U"shaped "O"-ring seal is preferred for the primary seal (4).

FIG. 7 is a cross-sectional side view of The Invention in a unlocked position. Removal of the padlock allows selective outward protraction of eye pin (2) through the enclosure body (1). The side of the tabular extension of enclosure body (1) which faces eye pin (2) is beveled at the top to enable a hook (such as the "U" bolt of the padlock) to pass through the hole (22) in eye pin (2), (but over the top of the tabular extension) when an operator is removing The Invention. The view if FIG. 7 is similar to FIG. 6 in that it is the same cross-sectional view, and that The Invention is fitted into the end of a pipe that is shown in phantom lines; however, the pad lock has been removed in FIG. 7, and eye pin (2) has been advanced through enclosure body (1).

The outward protraction of eye pin (2) through the enclosure body (1) opposes the force of spring (18), which is assembled around the shaft of eye pin (2). After eye-pin seal (3) disengages from the enclosure body (1), but prior to the point when sliding-toggle knee (19) is engaged by eye-pin-lock nut (17) (which causes the anchoring system to be disengaged) any fluid pressure differential between the capped pipe and the outer atmosphere will be relieved through the eye-pin-seal hole in the enclosure body (1). The new force from the outward protraction is transferred by eye-pin-lock nut (17) to sliding-toggle knee (19). Sliding-toggle knee (19) transmits the force from eye-pin-lock nut (17) to toggle bar #1 (15) and toggle bar #2 (16); which in turn transmit the force to cross-arm #1 (13) and cross-arm #2 (14), respectively. Through this linkage, the outward protraction of eye pin (2) provides a force which causes contraction away from the inner pipe walls of toggling cross-arms #1 (13) and #2 (14). In the state of having toggling crossarms #1 (13) and #2 (14) contracted, the mechanical resistance to removal of The Invention is eliminated, and the entire lockable pipe enclosure is extracted with little effort.

The composition of The Invention is the deciding factor in determining the manufacture and machine processes in constructing it. The composition of each unit manufactured is selected on: (I) compatibility with particular fluids that the unit is expected to be exposed to in the industrial application, (II) the structural strength of each component, and (III) the comparative cost of manufacture. Most applications will require a unit of The Invention constructed with a combination of materials, usually plastics (such as high-density polyethylene, or poly-urethane), and metals (such as stainless steel, and/or brass). The composition of the optional fluids seals is also selected on compatibility with particular fluids expected to be contacted in the industrial application, with Nitrile anticipated to be the best general-purpose elastomer.

Conclusions, Ramifications and Scope:

Enclosures for the entrances into well casings of environmental monitoring wells require a locking mechanism for access security. The Invention provides security from unauthorized entries into hollow ends of pipes onto which The Invention is attached. The locking mechanism of The Invention is a unique new design, which offers improvements in security, safety, and ease of operation.

While The Invention has a preferred design as described above, it is capable of further modifications, adaptions and/or alternative uses which will follow the principle of the invention, and which may include divisions of the present disclosure. Several design ramifications are foreseeable for alternative embodiments of the present invention. As different types of pipes come with differing inner and outer diameters, different production models of the present invention must be manufactured to accommodate the diversity. The shape of the enclosure body to be used must adapt to the shape of the interior of the pipe to be sealed; therefore, triangular, square, pentagonal, hexagonal, etc. shapes fall within the probable art of this invention. The Invention may be manufactured less costly, but with possible sacrifice to the utility value, by eliminating the swivel mechanism, or the spring. The structural strength of the enclosure body may be enhanced by building the enclosure body with radial fins atop the upper body surface. Any sort of handle may be adapted to the eye pin, or enclosure body, in order to make extraction of the present invention easier. The pullable-eye-pin-disengagement system for The Invention's toggle may be replaced with a rotating, or pivoting disengagement system. A keyed lock may be manufactured into the enclosure body to eliminate the necessary use of a separate padlock. Cams with sharpened spurs may be substituted for the toggle cross-arms. The toggle cross-arms may swivel on pivots (forming a knee) instead of on a shear pin or bolt. One toggle arm may be configured by itself with opposition to something other than another toggle arm, or toggle cross-arms may be configured in radial sets of three, four, five, six, etc. arms. While the present invention relates to enclosures for the ends of cylindrical pipes, the securing mechanism described hereinabove can also be used to secure the position of a device deep inside of a pipe by eliminating the lip (flange) of the enclosure body; with such invention units installed in both directions of a pipe, and with both units connected together, a temporarily-stationary but removable-positioning or hanging device is formed; or, with seals, a plug is formed.

The present invention encompasses and pertains to the specific disclosure enclosed herein, and to all such modifications, adaptions and /or alternative uses. The scope of the present invention encompasses and includes all aforementioned ramifications, and all further modifications, adaptions and/or alternate uses which will follow the principle of the invention, and which may include divisions of the present disclosure and/or further modifications, adaptions and/or alternate uses.

I claim:

1. A device for position holding within a hollow cylinder, comprising:

a) an assembly which is positioned either partially or entirely within the hollow cylinder, b) a means for transmitting a portion of any attempted dislodging force on the positioned assembly into resistance to the attempted dislodging force comprising; a frictional force means which provides a frictional force to an inner surface of the hollow cylinder, the frictional force is increased when a device removal force is applied, and c) a means for selectively engaging or disengaging the dislodging force transmitting means.

2. The device as set forth in claim 1 wherein said frictional force means further comprises a multiplicity of toggling cross-arms.

3. The device as set forth in claim 1 wherein said frictional force means further comprises a multiplicity of eccentric spurred cams.

4. The device as set forth in claim 1 wherein said means for transmitting a portion of any attempted dislodging force on the positioned assembly into resistance to the attempted dislodging force further comprises, a device movement dislodging force coupling means, which means provides increased dislodging force resistance when the device is moved in a direction from an interior of the hollow cylinder to an exterior of the hollow cylinder, and decreased dislodging force resistance when the body is moved in a direction from the hollow cylinder exterior to the hollow cylinder interior.

5. A lockable enclosure for securing access to an interior of a cylindrical pipe, the device comprising:

a) a cylindrical enclosure body having an outer diameter allowing the body to be disposed within the interior of the pipe, the body having an upper body surface, the body further comprising an internal swivel cavity, and an eye pin aperture extending from the swivel cavity to the upper body surface, b) a swivel body swively disposed within said internal swivel cavity, c) a toggling means disposed within said swivel body, said toggling means providing a frictional engagement means which selectively and frictionally engages the device within the interior of the pipe and a means for transmitting a device dislodging force into resistance to the attempted dislodging force, and d) an eye pin extending through said eye pin aperture and coupled to said toggling means providing a device external frictional engagement and disengagement linkage means.

6. The device as set forth in claim 5 wherein said means for transmitting a device dislodging force into resistance to the attempted dislodging force further comprises a cylindrical body movement dislodging force coupling means, which means provides increased fictional engagement of the toggling means when the body is moved in a direction from an interior of the pipe to an exterior of the pipe, and decreased frictional engagement when the body is moved in a direction from the pipe exterior to the pipe interior.

7. The device as set forth in claim 5 wherein said cylindrical body further comprises a cylindrical lower-central cylindrical extension, the cylindrical extension further comprising a tapered outer surface extending from an enclosure body cylindrical lip to a bottom surface of the closure body, further wherein said lip forms a perimeter lip of said body upper surface.

8. The device as set forth in claim 7 wherein said device further includes a means for sealing the pipe interior from a pipe exterior, said sealing means being disposed upon said cylindrical lower—central cylindrical extension, and upon said eye pin.

9. The device as set forth in claim 5 wherein said device further comprises a lockable means disposed upon said body upper surface, said lockable means providing a means to lock the device external frictional engagement and disengagement means.

10. The device as set forth in claim 5 wherein said device further comprises, a means for providing a seal between a pipe interior and exterior.

11. The device as set forth in claim 5 wherein said device further comprises a means for selectively venting the pipe interior.

12. The device as set forth in claim 5 wherein said eye pin and said eye pin aperture further comprise a means for selectively venting the interior of the pipe.

13. The device as set forth in claim 5 wherein said device further comprises an eye pin biasing means, said biasing means providing eye pin movement in a direction which encourages frictional engagement of the toggling cross arms when eye pin is moved to a locked position.

14. An enclosure device for securing access to the interior of a cylindrical pipe, the device is inserted into an open end of a pipe and is secured in place by a multiplicity of toggling cross-arms which selectively provide frictional force to an inner surface of the pipe, the friction force is increased when a device removal force is applied, the device comprising:

a) a cylindrical enclosure body comprising an enclosure body upper surface and a lower-central cylindrical extension, the cylindrical extension further comprising a tapered outer surface extending from an enclosure body cylindrical lip to a bottom surface of the enclosure body, an internal swivel cavity formed by interior surfaces of the lower-central cylindrical extension and an interior surface of the enclosure body upper surface, the cavity being open at the bottom surface of the enclosure body, an eye pin aperture extending from the swivel cavity to the upper body surface, the enclosure body cylindrical lip positioned around the upper surface, the cylindrical lip having an outside diameter about equal or larger than an outside diameter of the pipe in which the device is inserted, the cylindrical lip further providing a means which prevents the upper body surface to be inserted past an outside edge of an open cylindrical pipe, b) a cylindrical swivel having a shouldered portion and a lower portion, the shouldered portion being disposed and retained within the swivel cavity by a swivel retaining ring, the swivel retaining ring further being fixedly secured to the bottom surface of the enclosure body, the cylindrical lower portion extending from the swivel cavity and retaining ring, the cylindrical swivel further being dimensioned to freely rotate within the cavity once retained by the ring, the cylindrical swivel further comprising a multiplicity of slots extending from a bottom edge of the lower portion of the swivel to a bottom edge of the shouldered portion, a multiplicity of cross-arms positioned within the slots and further having pivoting ends and frictional engagement ends, the cross-arm pivoting ends being pivotally mounted about a pin near a center of the bottom edge of the lower portion of the swivel, the pivotal attachment allowing the frictional ends of the cross-arms to move in an arching motion within the slots, the arching motion starting from an area near the retaining ring and ending when the frictional end contacts the inner surface of the pipe, the cross-arms further having a length which does not allow the arching motion to extend the cross-arms to a position past perpendicular to a center line of the pipe, c) the eye-pin further comprising a top end extending through the enclosure body upper surface eye-pin aperture, and a bottom threaded end extending into the cylindrical swivel, a sliding toggle knee disposed upon said eye-pin bottom end and retained upon the eye-pin bottom end by an eye-pin fastener, a multiplicity of toggle bars extending from the knee to the cross-arms, one bar attaching to each cross-arm, the bars further being attached to the cross-arms near the cross-arm frictional ends so that when the eye-pin is moved in a direction toward the interior of the pipe the cross-arm frictional ends move in an arching motion toward and ultimately contact the pipe interior surface preventing removal of the device from the pipe interior and conversely when the eye-pin is moved in a direction away from the interior of the pipe the cross-arms are moved in an arching motion away from the pipe interior surface allowing removal of the device from the interior of the pipe, d) a locking means for selectively preventing the movement of the eye-pin, e) means for providing a seal between the interior and exterior of the pipe, and f) a means biasing eye-pin movement in the direction toward the interior of the pipe.

* * * * *